United States Patent
Watanabe (10) Patent No.: US 6,542,726 B2
(45) Date of Patent: Apr. 1, 2003

(54) PERSONAL DATA ASSISTANT TERMINAL WITH RADIO

(75) Inventor: Mitsuhiro Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/093,257

(22) Filed: Jun. 8, 1998

(65) Prior Publication Data
US 2001/0044286 A1 Nov. 22, 2001

(30) Foreign Application Priority Data

Jun. 10, 1997 (JP) ............................................. 9-152460

(51) Int. Cl.[7] ................................................ H04B 1/16
(52) U.S. Cl. ....................... 455/343; 455/231; 455/574; 340/7.32; 340/7.38
(58) Field of Search ............................... 455/231, 234.2, 455/403, 127, 343, 572, 574, 575, 556; 340/7.38, 7.32

(56) References Cited

U.S. PATENT DOCUMENTS

| 5,404,543 A | * | 4/1995 | Faucher et al. | ......... 395/750.01 |
| 5,471,655 A | * | 11/1995 | Kivari | ......... 455/127 |
| 5,617,572 A | * | 4/1997 | Pearce et al. | ......... 395/750.03 |
| 5,625,673 A | * | 4/1997 | Grewe et al. | ......... 455/556 |
| 5,754,798 A | * | 5/1998 | Uehara et al. | ......... 395/750.03 |
| 5,815,807 A | * | 9/1998 | Osmani et al. | ......... 455/410 |
| 5,903,601 A | * | 5/1999 | Elnashar et al. | ......... 395/750.04 |
| 5,918,058 A | * | 6/1999 | Budd | ......... 710/316 |
| 5,926,394 A | * | 7/1999 | Nguyen et al. | ......... 364/489 |
| 5,953,646 A | * | 9/1999 | Hirasawa | ......... 455/343 |

FOREIGN PATENT DOCUMENTS

| JP | 2-209069 | 8/1990 |
| JP | 6-150076 | 5/1994 |

* cited by examiner

Primary Examiner—William Trost
Assistant Examiner—Simon Nguyen
(74) Attorney, Agent, or Firm—Dickstein Shapiro Morin & Oshinsky LLP (57) ABSTRACT

The invention provides a personal data assistant terminal with radio having data transmission and reception functions by a radio wave wherein the applied power supply mode of a CPU can be changed over to a power supply mode required by a peripheral circuit to the CPU. When a power supply mode change-over signal representing a power supply mode which is to be entered subsequently and a power supply mode defining signal for defining the power supply mode represented by the power supply mode change-over signal are inputted from the outside to a power supply control section of a CPU, a CPU core in the CPU changes over the applied power supply mode of the CPU to the power supply mode represented by the power supply mode change-over signal.

6 Claims, 8 Drawing Sheets

PERSONAL DATA ASSISTANT TERMINAL WITH RADIO

BACKGROUND OF THE INVENTION

1. Field of the Invention

The present invention relates to a personal data assistant terminal with radio which has data transmission and reception functions by a radio wave and a plurality of different power supply modes and includes a central processing unit (CPU) which effects power supply control.

2. Description of the Related Art

A conventional personal data assistant terminal with radio includes a CPU which often has a function of controlling power supply thereto to control the terminal.

In a personal data assistant terminal with radio of the type described, transition of the power supply condition is performed such that, if it is assumed, for example, that the three power supply conditions of "FULL", "SLOW" and "SUSPEND" are available, then although the applied power supply condition can be changed over from the "FULL" condition to the "SLOW" condition or to the "SUSPEND" condition arbitrarily depending upon a set state of a register of the CPU, it can be changed over from the "SLOW" condition only to the "SUSPEND" condition depending upon the set state of the register, or transition to the "FULL" condition is allowed only when some interruption occurs. Further, when it is tried to render the terminal operative while the power supply is in the "SUSPEND" condition, the applied power supply condition can be changed over only to the "FULL" condition.

Meanwhile, in a terminal which utilizes a radio wave, operation noise of a CPU has a bad influence on a radio signal transmitted from or received by the terminal. Therefore, in order to reduce such noise, the terminal requires such a countermeasure as to make the frequency of an operation clock signal of the CPU as low as possible upon transmission or reception of a radio signal.

However, if it is intended to render the terminal operative while the power supply is in the "SUSPEND" condition, since such a conventional power supply control method as described above changes over the applied power supply condition only to the "FULL" condition, the terminal is influenced much by noise then.

Meanwhile, an automatic terminating system for a small-size portable terminal which effects power supply control in response to termination of a call to a modem of a handy terminal which includes a modem phone and an interface unit is disclosed in Japanese Patent Laid-Open Application No. Heisei 2-209069. In the automatic terminating system, the power supply control is effected using two CPUs, that is, a main CPU and a sub CPU, and power supply to the main CPU is controlled between on and off by power supply control of the sub CPU, and the sub CPU detects a carrier indicator (CI) signal of the modem by hardware and changes over the mode of itself from a sleep mode to an on mode. In this manner, each of the CPUs has the only two modes of the power supply on mode and the power supply off mode.

A portable terminal which makes use of an IC card is disclosed in Japanese Patent Laid-Open Application No. Heisei 6-150076. In the portable terminal, the IC card discriminates a command issued from a host CPU, and a CPU in the IC card issues a command to the IC card to put the terminal and the IC card into individual power supply modes.

Figure 8:
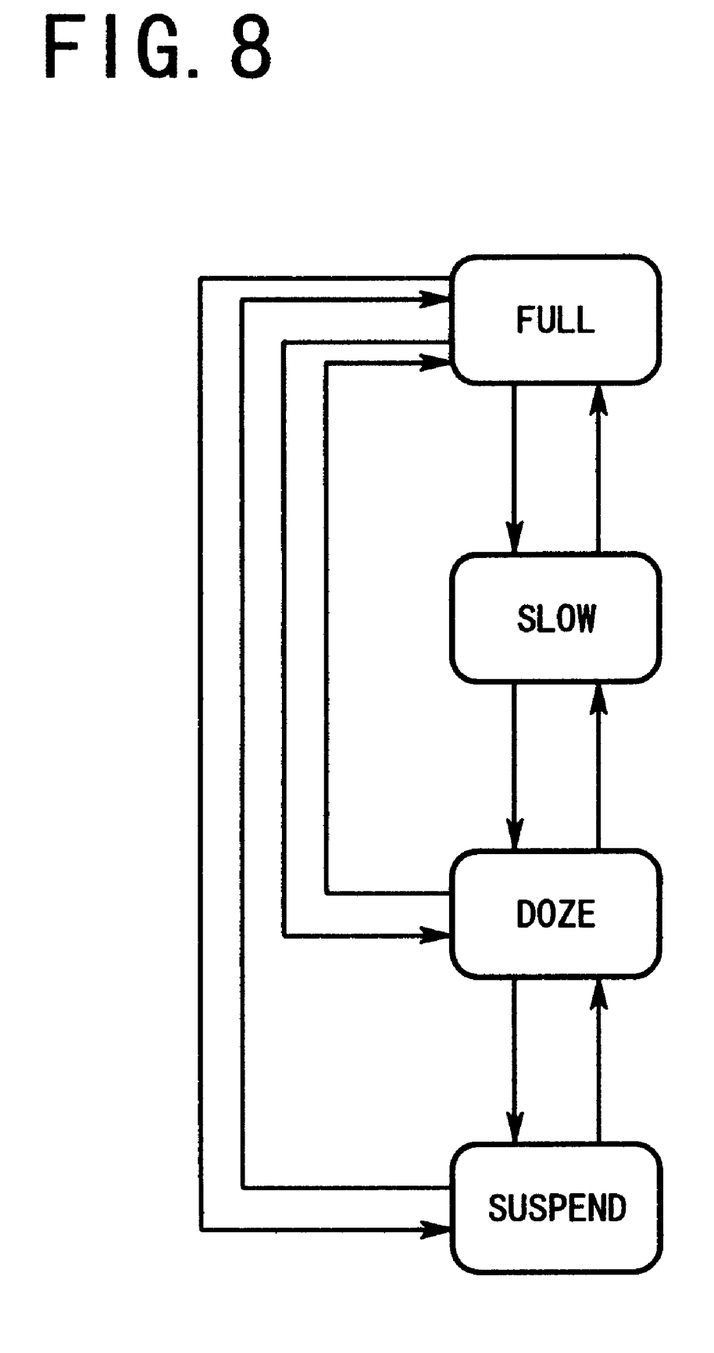
FIG. 8 is a diagram illustrating conventional power supply mode transitions of a CPU.

However, where a CPU itself issues a command of software to enter power supply modes as in the portable terminal which makes use of an IC card described above, if the CPU has a plurality of interrupt inputs, then the CPU must discriminate the type of the current interruption and issue a command for a corresponding power supply mode so as to enter the pertaining power supply mode. Therefore, such a procedure that the applied power supply mode is changed over to a power saving mode after the "FULL" operation mode is entered once must be taken. Such a power supply transition condition is schematically illustrated in FIG. 8. This is because an apparatus which makes use of a radio wave suffers from the problem that, if the "FULL" operation mode is entered once, then the radio wave condition is deteriorated to such a degree as to disable radio wave communication by electromagnetic noise generated from the CPU. Since noise generated from the CPU decreases in proportion to the square of the distance between the CPU and the radio unit, the distance between the radio unit and the CPU should be maximized. However, an apparatus having a small-size housing such as a portable terminal basically suffers from the problem described above since a sufficient distance cannot be secured between the radio unit and the CPU.

Meanwhile, in the automatic terminating system for a small-size portable terminal disclosed in Japanese Patent Laid-Open Application No. Heisei 2-209069 mentioned above, the CPU has only two power supply modes of the power supply on mode and the power supply off mode. Where only the two power supply on and off modes are involved, the main CPU is put into an operative condition by an external factor only when the "FULL" mode is entered. Consequently, it is impossible to control the speed of the CPU in order to minimize the influence upon a radio wave upon operation of the CPU as in a personal data assistant terminal with radio. Accordingly, it is difficult to handle radio data while the CPU is operative.

SUMMARY OF THE INVENTION

It is an object of the present invention to provide a personal data assistant terminal with radio wherein a power supply mode required by a peripheral circuit to a CPU can be entered arbitrarily.

In order to attain the object described above, according to an aspect of the present invention, there is provided a personal data assistant terminal with radio which has data transmission and reception functions by a radio wave and a plurality of different power supply modes, comprising a CPU for effecting power supply control of the personal data assistant terminal with radio, the CPU having a terminal for receiving, as an input signal thereto, a power supply mode change-over signal representative of a power supply mode which is to be entered subsequently by the CPU, and another terminal for receiving, as an input signal thereto, a power supply mode defining signal for defining a power supply mode represented by the power supply change-over signal.

The power supply modes may include a "FULL" mode in which a system clock signal with which the CPU operates has a first frequency, a "SLOW" mode in which the system clock signal has a second frequency lower than the first frequency, a "DOZE mode in which the system clock signal has a third frequency lower than the second frequency and some of functions of the CPU are inoperative, and a "SUSPEND" mode in which the power supply is close to that in a power supply off mode in which no power is supplied to the CPU.

The personal data assistant terminal with radio may further comprise an external peripheral circuit which includes means for indicating a power supply mode to be entered subsequently to the CPU, the power supply mode defining signal being put into an effective condition in a timed relationship with a power supply transition timing signal of the peripheral circuit.

Preferably, the CPU is started in a mode in which the CPU generates minimum electromagnetic noise in response to an instruction from a circuit which controls power supply to a peripheral circuit in response to a starting instruction of the CPU.

In the personal data assistant terminal with radio, a mode to which the applied power supply mode is to be changed over subsequently when the CPU is to return to an operative condition from the "SUSPEND" mode thereof can be determined using the external input signals, and consequently, transition to an arbitrary power supply mode requested by the external peripheral circuit to the CPU can be performed. Consequently, for example, from the "SUSPEND" mode of the CPU in which the CPU is almost in a stopping condition, the CPU can be put into an operative condition in the "SLOW" mode or the "DOZE" mode in which the CPU generates comparatively little noise in accordance with a request from the external peripheral circuit such as a radio communication circuit of the personal data assistant terminal with radio. Accordingly, noise generation by the CPU to the radio communication circuit can be suppressed to the utmost.

Basically, by the construction described above, also in such a case that the CPU is put into an operative condition from the "SUSPEND" mode in response to a trigger provided by inputting of data of a radio wave, transition not only to the "FULL" mode but also to the "SLOW" mode can be performed by setting the mode to be entered subsequently through the external input terminals.

This signifies that, particularly when power supply control is to be performed in a peripheral circuit which includes a sub CPU or a like element, the power supply to the CPU can be controlled directly from the outside of the CPU.

In summary, with the personal data assistant terminal with radio, since the applied power supply mode of the CPU can be changed over arbitrarily using a signal of a peripheral circuit to the CPU, it is possible to put the personal data assistant terminal with radio from a "SUSPEND" condition to a power supply on condition while a radio section of the personal data assistant terminal with radio remains operative and particularly to put the CPU into an operative condition in the "SLOW" mode in which noise generation of the CPU is comparatively little so that the radio section may not be stopped from communication by electromagnetic noise of the CPU. Consequently, the personal data assistant terminal with radio is less liable to be influenced by electromagnetic noise of the CPU during radio communication.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
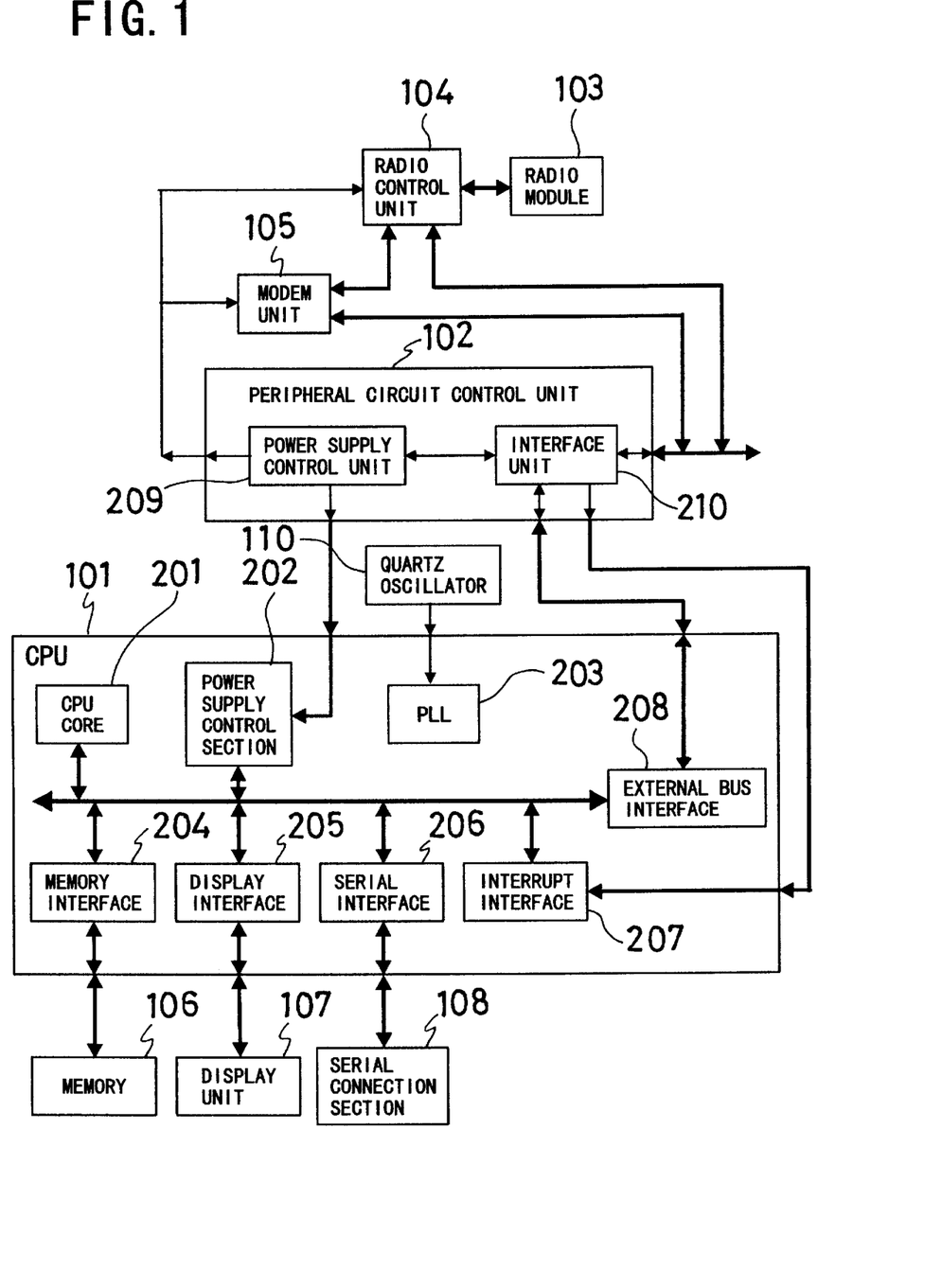
FIG. 1 is a block diagram of a personal data assistant terminal with radio to which the present invention is applied.

Referring first to FIG. 1, there is shown in block diagram a personal data assistant terminal with radio to which the present invention is applied. The personal data assistant terminal with radio shown includes a CPU 101 which includes, as internal circuitry thereof, some of external peripheral circuits which are basic components required to construct the personal data assistant terminal with radio, a peripheral circuit control unit 102 having a function for controlling those peripheral circuits which are not included in the CPU 101, a radio module 103 such as a portable telephone set for emitting a radio wave, a radio control unit 104 for controlling operation of the CPU 101, peripheral circuit control unit 102 and radio module 103, a modem unit 105, a memory 106 for storing a program for the CPU 101, transient data and display data therein, a display unit 107, and a serial connection section 108.

The CPU 101 includes a CPU core 201, a power supply control section 202, a phase locked loop (PLL) circuit 203, a memory interface 204, a display interface 205, a serial interface 206, an interrupt interface 207, and an external bus interface 208. The PLL circuit 203 produces a system clock signal in the CPU 101 in response to an oscillation signal from a quartz oscillator 110. The power supply control section 202 controls power supplies to the blocks in the CPU 101.

The CPU 101 effects information processing and so forth of the personal data assistant terminal with radio and executes a main program. The CPU 101 controls a radio unit composed of the radio control unit 104 and the radio module 103, and further controls those external peripheral circuits which include no power supply. For example, with regard to the radio unit, the CPU 101 controls communication data received by the radio unit.

The CPU 101 produces an operation clock signal for itself using the PLL circuit 203 therein and has four power supply modes of "FULL", "SLOW", "DOZE" and "SUSPEND". The power supply modes other than the "FULL" mode may hereinafter referred to as power down modes.

Now, definitions of the power supply modes of the CPU 101 are described. The "FULL" mode is a mode in which the CPU 101 operates with the system clock signal which exhibits its highest speed. In the "FULL" mode, the power dissipation and the output noise of the CPU 101 are in the highest. The "SLOW" mode is a mode in which the CPU 101 exhibits the same operational functions as in the "FULL" mode but operates with the system clock signal for execution of a program which is lower in frequency than in the "FULL" mode. In the "SLOW" mode, the power dissipation and the output noise of the CPU 101 are in the second highest. The "DOZE" mode is a mode in which available functions of operation of the CPU 101 are reduced with respect to those in the "FULL" mode or the "SLOW" mode while some functions are rendered inoperative. For example, in the "DOZE" mode, no external display is provided. Further, in the "DOZE" mode, the CPU 101 operates with a further lower frequency than that in the "SLOW" mode. The "SUSPEND" mode is a mode in which the CPU 101 operates but in a condition close to that where the power supply is off and the CPU 101 and also the PLL circuit 203 for operating the internal peripheral circuits of the CPU 101 are both inoperative. The "SUSPEND" mode is different from the power supply off condition in that the states of internal registers are kept without being reset so that the CPU 101 can be put back into an operative condition in response to an external input signal. In the "SUSPEND" mode, the power dissipation is in the lowest, and since no circuit is operating, the CPU 101 generates no noise.

Figure 2:
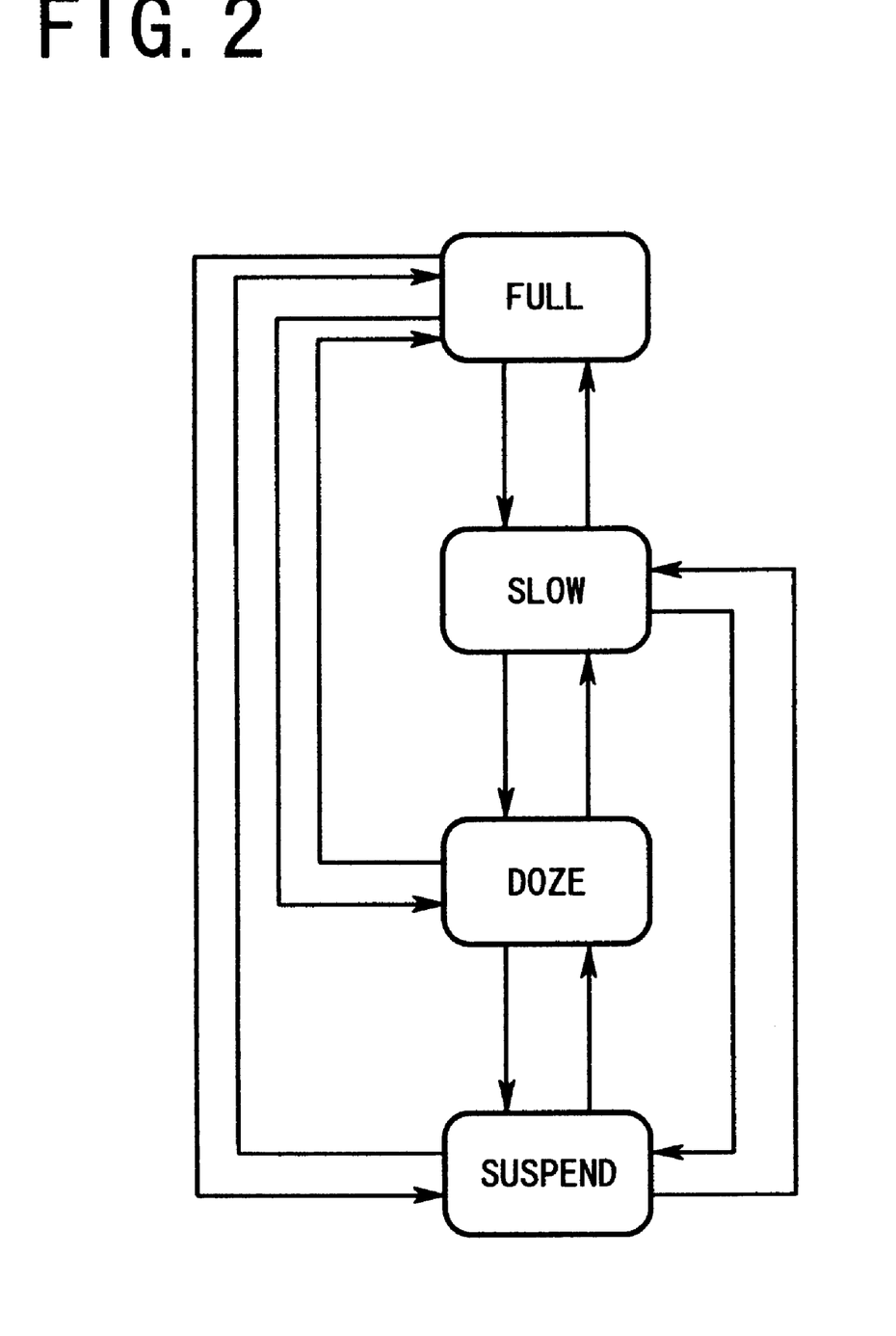
FIG. 2 is a diagram illustrating mode transitions of a CPU of the personal data assistant terminal with radio of FIG. 1.

The CPU 101 can cause such transitions of the power supply mode as illustrated in FIG. 2 to occur in response to a signal from an external circuit thereto. In particular, it can be seen from FIG. 2 that, in whichever one of the "FULL", "SLOW", "DOZE" and "SUSPEND" modes the CPU 101 is, the applied power supply mode can be changed over to any one of the four power supply modes in response to an external input. Further, the CPU 101 can enter any one of the "SLOW", "DOZE" and "SUSPEND" modes in accordance with a set state of an internal register so that the CPU 101 can be reset from a power down mode also in response to an interrupt signal other than the set state by the external circuit. However, upon resetting by an interruption, the CPU 101 normally enters the "FULL" mode.

Figure 3:
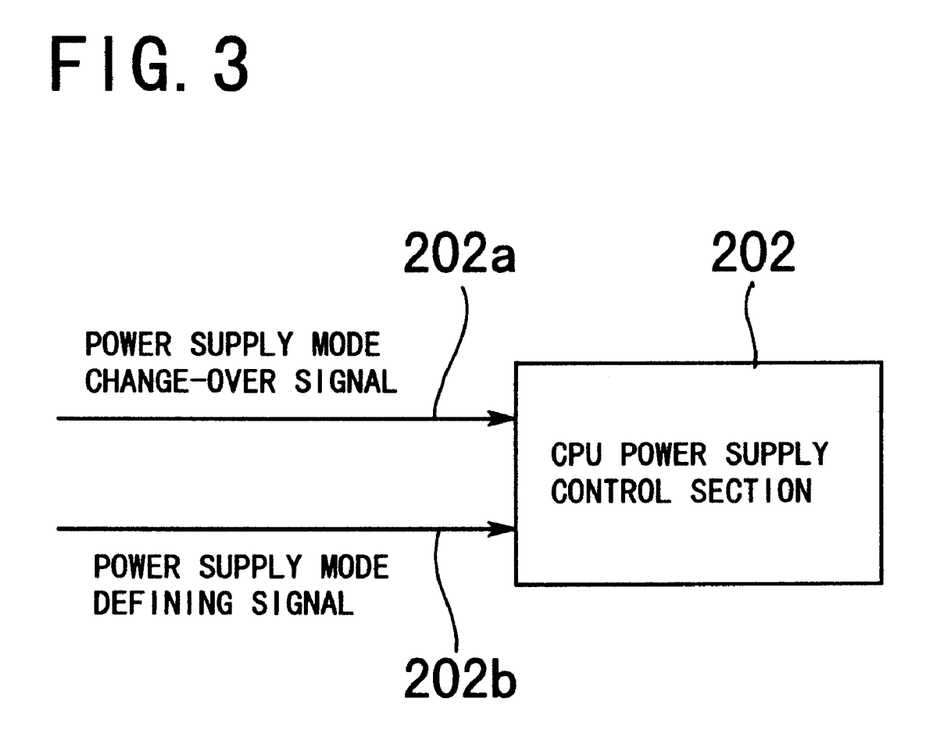
FIG. 3 is a diagram illustrating input signals to a power supply control section of the CPU of the personal data assistant terminal with radio of FIG. 1.

Referring to FIG. 3, the power supply control section 202 includes, as input terminals for receiving signals from the outside of the CPU 101, an input terminal for a power supply mode change-over signal 202a and another terminal for receiving a power supply mode defining signal 202b for defining the power supply mode change-over signal 202a. Since the CPU 101 has totally four power supply modes as described above with reference to FIG. 2, the power supply mode change-over signal 202a requires 2 bits to select one of the four power supply modes. The power supply mode defining signal 202b is a 1-bit signal. The power supply mode defining signal 202b simultaneously serves as a signal for causing an interruption to the CPU core 201.

Referring back to FIG. 1, the CPU core 201 detects an interruption by the power supply mode defining signal 202b, and determines what is to be performed by software and performs necessary processing in a pertaining power supply mode.

Figure 4:
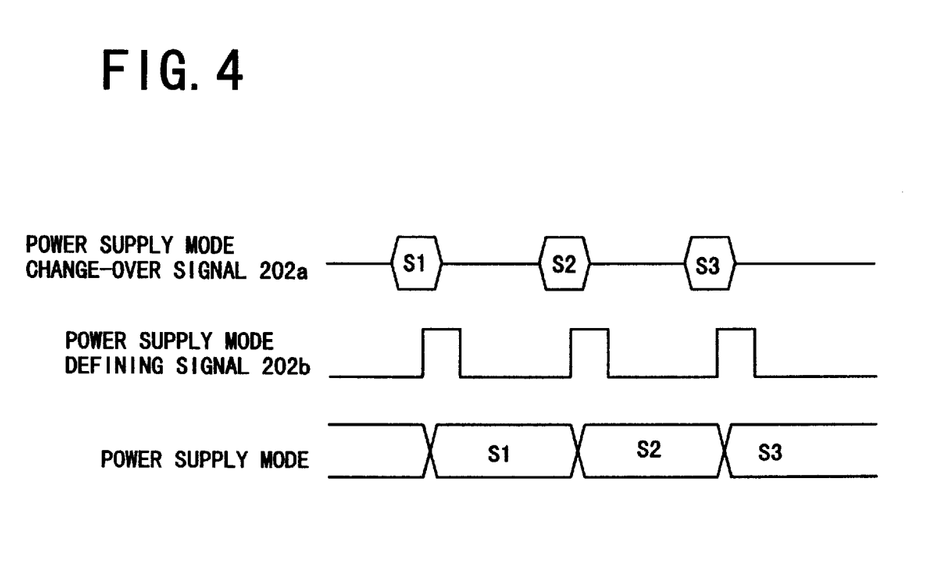
FIG. 4 is a timing chart illustrating definition of a power supply mode of the personal data assistant terminal with radio shown in FIG. 1.

FIG. 4 illustrates timings for defining such inputs as described above. Referring to FIG. 4, the power supply mode change-over signal 202a is defined at a rising edge of the power supply mode defining signal 202b. A transition to another power supply mode is defined at a rising edge of the power supply mode defining signal 202b, and this signal serves as a trigger to cause the CPU 101 to enter a pertaining power supply mode. If the 2 bits of the power supply mode change-over signal 202a are determined such that the values of them represent, for example, as follows:

00: SUSPEND
01: DOZE
10: SLOW
11: FULL then, if the power supply mode is defined when the power supply mode change-over signal 202a is "01", then the CPU 101 subsequently enters the "DOZE" mode.

Referring back again to FIG. 1, the peripheral circuit control unit 102 includes a power supply control unit 209 for controlling the power supplies to the CPU 101, modem unit 105, and radio control unit 104, and an interface unit 210 for allowing the peripheral blocks and the CPU 101 to interface with each other and allowing the CPU 101 to read the register which indicates the applied mode of power supply control.

The power supply control unit 209 principally effects power supply control and, while it may have any construction, it is assumed here that it includes a sub CPU (not shown) provided with an analog to digital (A/D) converter. The power supply control unit 209 uses the A/D converter to monitor an external power supply such as a battery (not shown) for driving all of the components of the personal data assistant terminal with radio and effects various operations such as, for example, to indicate if the voltage value of the external power supply drops, such drop of the voltage value to the CPU 101 so that the CPU 101 may enter a sequence in which the power supplies to the external peripheral circuits and the radio unit are interrupted. The power supply control unit 209 plays a role also to make up for functions which are not provided for the CPU 101. For example, in the present personal data assistant terminal with radio, the power supply control unit 209 has such functions which the CPU 101 does not have as a function of controlling an inputting apparatus such as a keyboard or a touch panel (neither is shown) or another serial or parallel communication function of communicating with another terminal or some other apparatus (neither is shown). If the internal circuits of the CPU 101 have all such functions, then no external peripheral circuit is required. Otherwise, however, any function which cannot be provided by the CPU 101 is made up for by an external peripheral circuit.

The radio control unit 104 and the radio module 103 are used to effect communication with another portable radio apparatus (not shown), which has a radio communication function similarly as in the present invention, using a radio wave or communication with some other apparatus (not shown), which has a radio communication function similarly as in the present invention, using a commonly applicable communication protocol. The modem unit 105 is used to convert, where the personal data assistant terminal with radio tries to effect data communication with another terminal whose communication protocol is different, communication data once into sound data to allow communication of the same although it is not required where the protocol of a radio wave of the personal data assistant terminal with radio is coincident with that for data communication. Even where the other party terminal does not support data communication, data communication can be realized artificially by using a modem.

Figure 5:
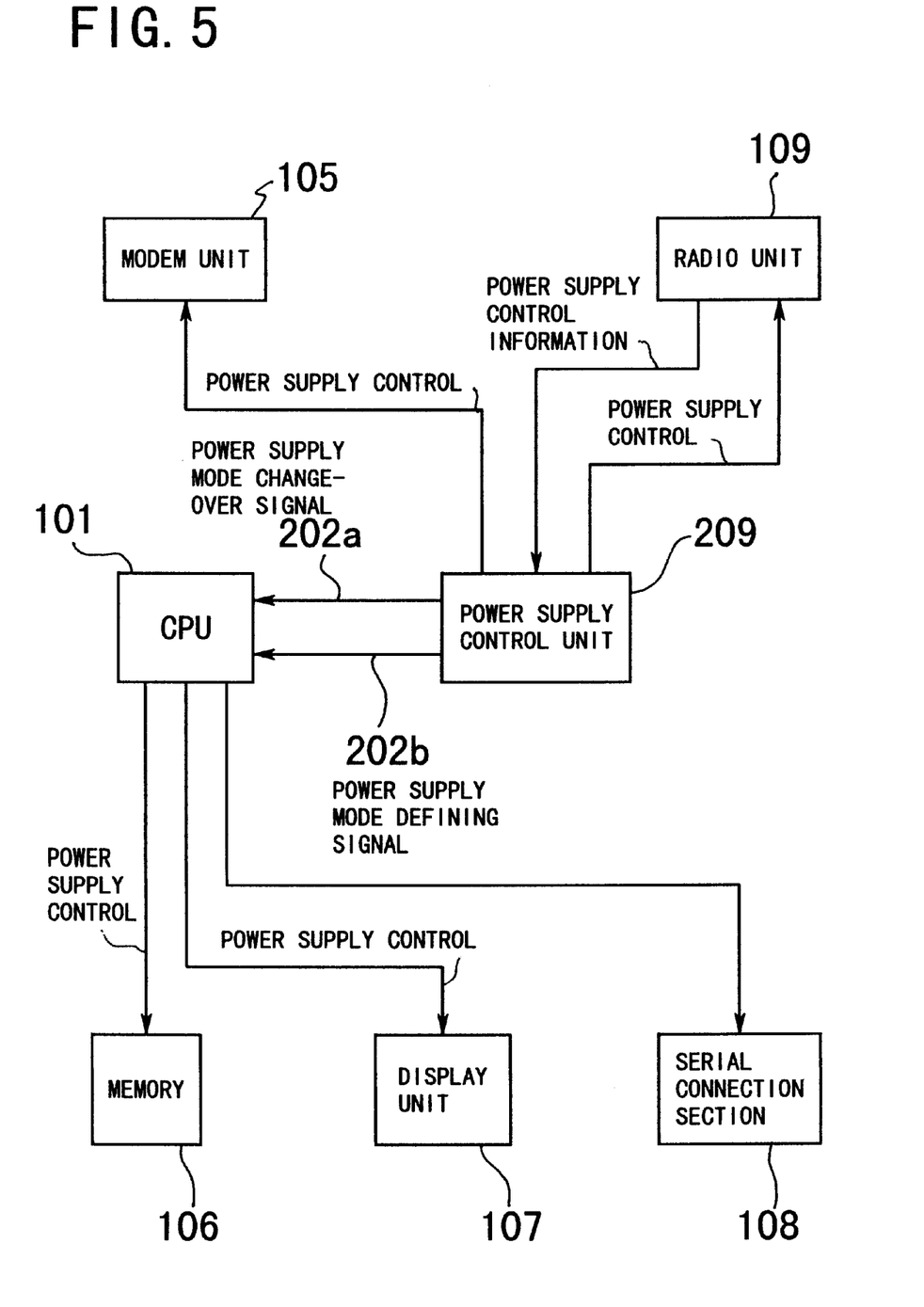
FIG. 5 is a block diagram showing power supply control lines of the personal data assistant terminal with radio of FIG. 1.

FIG. 5 shows power supply control lines of the portable radio apparatus shown in FIG. 1. Referring to FIG. 5, the power supplies to the memory 106, display unit 107 and serial connection section 108 are controlled by the CPU 101 since they make peripheral circuits close to the CPU 101. The power supply to the memory 106 is controlled in accordance with the operation mode of the CPU 101 since the memory 106 is always required while the CPU 101 is operating. The power supply to the display unit 107 is controlled such that, when radio communication is proceeding on the background, the display unit 107 is kept off since it need not be lit. In this manner, the power supply to each of the components of the personal data assistant terminal with radio is determined to be on or off based on a situation of use of the personal data assistant terminal with radio. This also applies similarly to the serial connection section 108. Also the on/off condition of the power supply to the modem unit 105 is determined based on a situation of use of the personal data assistant terminal with radio similarly as described above.

The radio unit 109 shown in FIG. 5 includes the radio control unit 104 and the radio module 103 of FIG. 1. The radio unit 109 may possibly operate when the CPU 101 is in the "SUSPEND" mode, that is, in an almost stopping condition. This maybe, for example, a reception waiting condition of a portable telephone set. In this instance, the radio unit 109 enters a receiving condition in response to a call originated from another portable radio apparatus or some other communication unit, and the power supply controlling information signal of the radio unit 109 is put into an effective mode and delivered to the radio control unit 104 to indicate the call.

When the information signal is received from the radio unit 109, the radio control unit 104 determines a mode for putting the CPU 101 into an operative condition based on the call from the radio unit 109 and writes a value representing the determined mode into the power supply mode change-over signal 202a. On the other hand, the CPU 101 reads the value of the power supply mode change-over signal 202a and enters a starting condition corresponding to the thus read value.

In this manner, the power supply control unit 209 sets a value conforming to a starting condition then and puts the CPU 101 into an operating condition conforming to the mode. This signifies that also the external circuits can be controlled similarly.

As an example, if "10" is written into the power supply mode change-over signal 202a and the power supply mode change-over signal 202a is defined with the power supply mode defining signal 202b, then since "10" in the present embodiment defines the "SLOW" mode, the CPU 101 changes over the applied power supply mode of itself to the "SLOW" mode after the power supply mode is defined. Since the CPU 101 which has been in the "SUSPEND" mode resumes its operation not in the "FULL" mode but in the "SLOW" mode, radio data communication is performed while noise of the CPU 101 is comparatively little and a bad influence of such noise upon the radio unit 109 is minimized.

Figure 6:
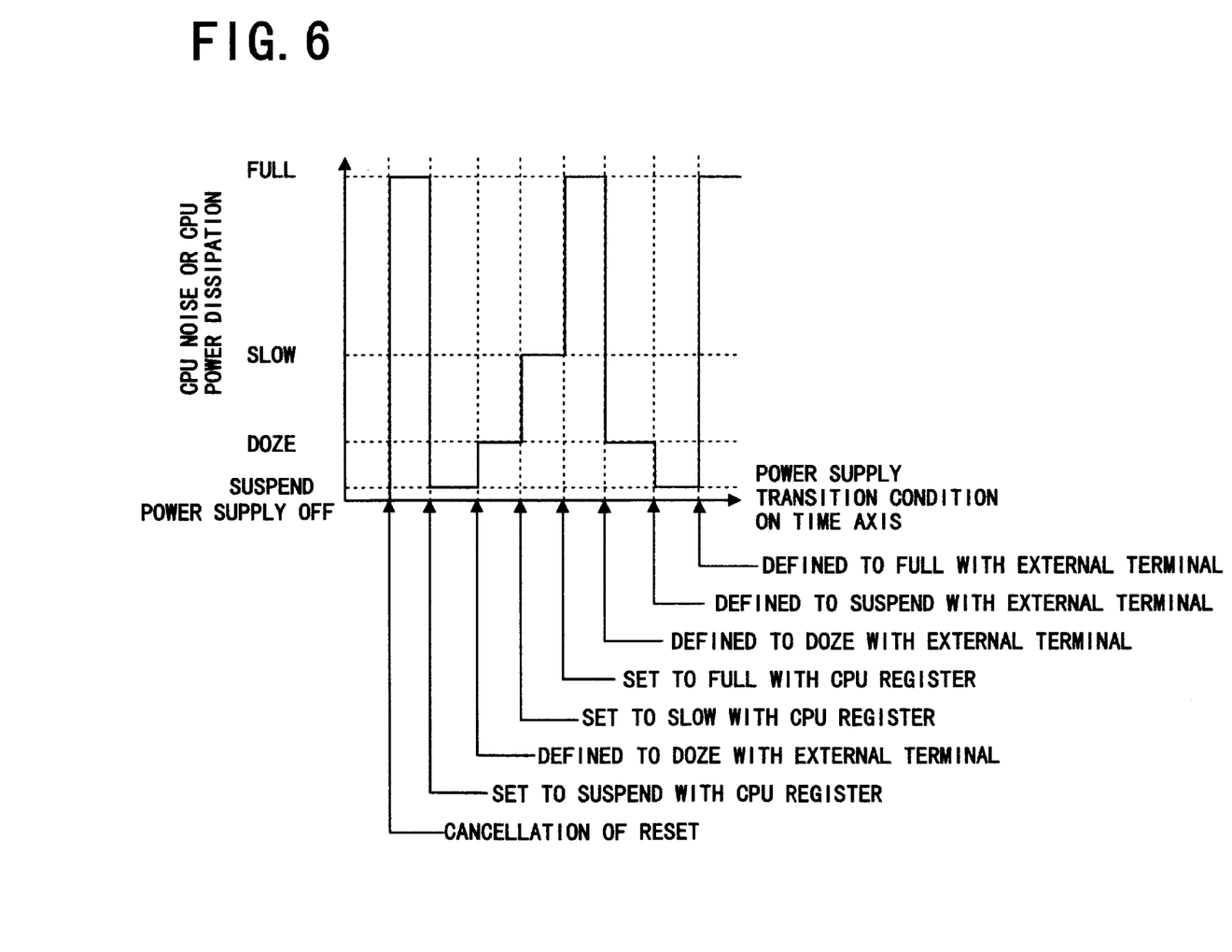
FIG. 6 is a graph illustrating CPU noise upon power supply mode transition.

Referring to FIG. 6, the axis of ordinate indicates the noise generated by the CPU 101 or the power dissipation and the axis of abscissa indicates the time, and FIG. 6 illustrates a manner wherein the power supply mode is successively changed over after each certain interval of time. Where it is not desired to raise the power dissipation suddenly from the problem of a power supply element such as a battery, it is possible to change over the power supply mode from the "SUSPEND" mode successively to the "DOZE" mode, the "SLOW" mode and the "FULL" mode so as to successively raise the power dissipation. Further, while, in FIG. 6, the power supply mode is successively changed over to another mode in which the noise or power dissipation is higher using the register of the CPU 101, naturally such a situation as just described can be produced by a factor of an external circuit by controlling the power supply mode change-over signal 202a and the power supply mode defining signal 202b.

Figure 7:
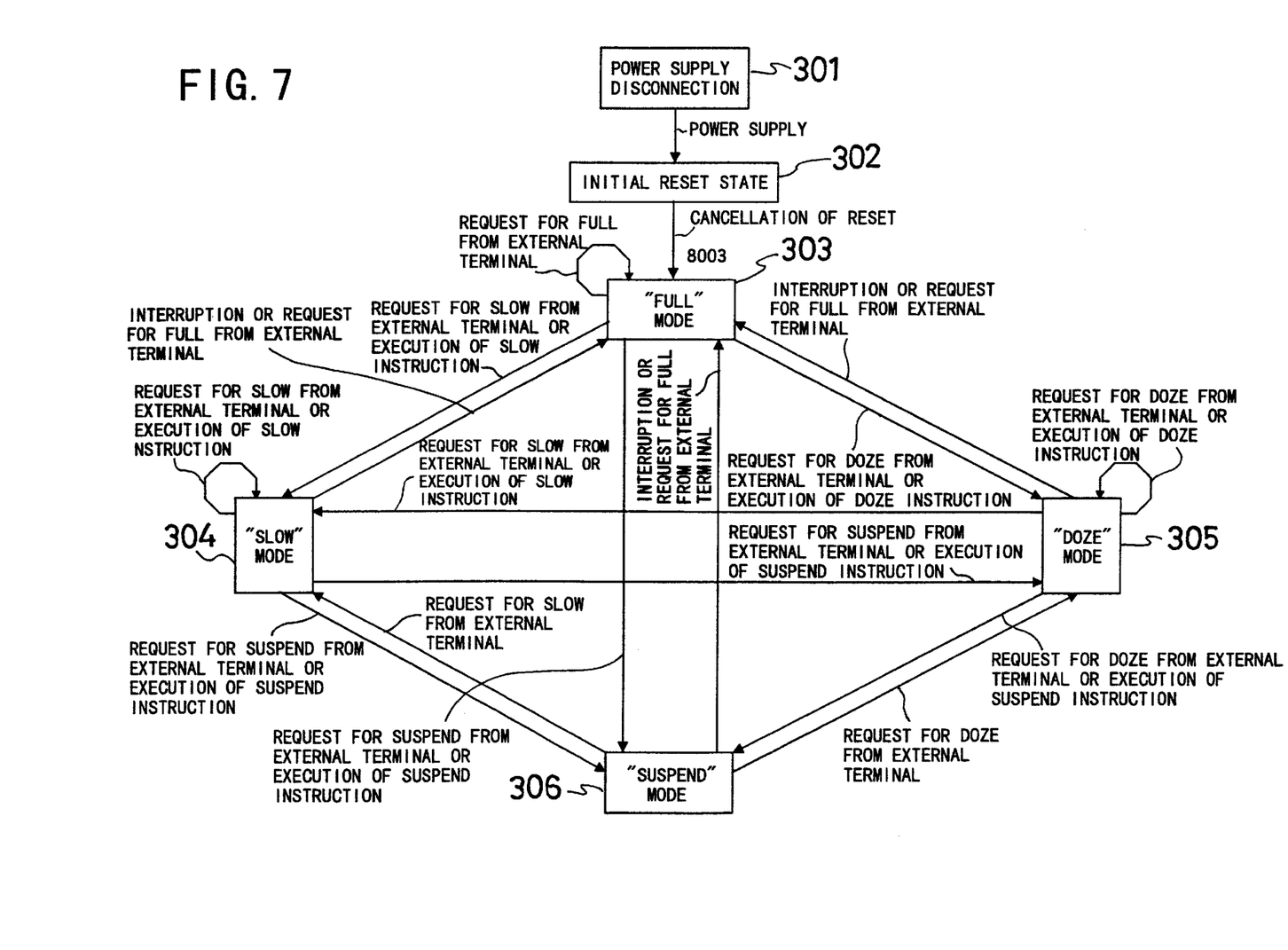
FIG. 7 is a diagram illustrating mode transitions of the CPU of the personal data assistant terminal with radio of FIG. 1.

FIG. 7 illustrates transitions of the power supply mode. Referring to FIG. 7, immediately after power supply is started in a power supply disconnection 301 which is a condition in which no power supply is received, the CPU 101 remains in a reset mode which has been established by power-on-resetting. This is an initial reset state 302. After the reset mode is cancelled, the CPU 101 enters an operative condition and the power supply mode enters a "FULL" mode 303. If a "SLOW" mode instruction by the register of the CPU 101 is executed or the "SLOW" mode is requested by the power supply mode change-over signal 202a, then the power supply mode of the CPU 101 is changed over to a "SLOW" mode 304. Similarly, if a "DOZE" mode instruction by the register of the CPU 101 is executed or the "DOZE" mode is requested by the power supply mode change-over signal 202a, then the power supply mode of the CPU 101 is changed over to a "DOZE" mode 305, but if a "SUSPEND" mode instruction by the register of the CPU 101 is executed or the "SUSPEND" mode is requested by the power supply mode change-over signal 202a, then the power supply mode of the CPU 101 is changed over to a "SUSPEND" mode 306. Where the power supply mode change-over signal 202a is used to effect mode transition, transition from any mode to another mode is possible. However, where an instruction of the CPU 101 is used to effect mode transition, although transition to any mode is possible from the "FULL" mode 303, transition from the "SUSPEND" mode to another mode is not possible except by an interruption because the CPU 101 is inoperative in the "SUSPEND" mode. Besides, in this instance, transition only to the "FULL" mode 303 is possible. Similarly, also when the CPU 101 is in the "DOZE" mode 305 in which it is inoperative, the CPU 101 cannot restore its operative condition except by an interruption. However, transition to any mode is allowed where the power supply mode change-over signal 202a is used.

While preferred embodiments of the present invention have been described using specific terms, such description is for illustrative purpose only, and it is to be understood that changes and variations may be made without departing from the spirit or scope of the following claims.

What is claimed is:

1. A personal data assistant terminal which has data transmission and reception functions by a radio wave and a plurality of different power supply modes, comprising:

a radio;

a CPU for effecting power supply control of said personal data assistant terminal, the CPU having an operating condition defined by a plurality of power supply modes in which a system clock signal has a different frequency in each of the plurality of modes of said CPU, in addition to an off mode; and a power supply control for controlling the operating condition, by way of the power supply modes, of said CPU, the power supply control receiving status information from peripheral circuits and controlling the operative condition of said CPU based on a status of a peripheral circuit of said personal data assistant terminal;

said power supply control having a terminal for transmitting, as an input signal to said CPU, a power supply mode change-over signal representative of one of said plurality of power supply modes which is to be entered subsequently by said CPU, and another terminal for transmitting, as an input signal to said CPU, a power supply mode defining signal for defining said power supply mode represented by the power supply change-over signal.

2. A personal data assistant terminal with radio as claimed in claim 1, wherein the power supply modes include a "FULL" mode in which a system clock signal with which said CPU operates has a first frequency, a "SLOW" mode in which the system clock signal has a second frequency lower than the first frequency, a "DOZE mode in which the system clock signal has a third frequency lower than the second frequency and some of functions of said CPU are inoperative, and a "SUSPEND" mode in which the power supply is close to that in a power supply off mode in which no power is supplied to said CPU.

3. A personal data assistant terminal with radio as claimed in claim 1, wherein said power supply control comprises a peripheral circuit external to said CPU which includes means for indicating a power supply mode to be entered subsequently to said CPU, the power supply mode defining signal being put into an effective condition in a timed relationship with a power supply transition timing signal of said peripheral circuit.

4. A personal data assistant terminal with radio as claimed in claim 1, wherein said CPU is started in a mode in which said CPU generates minimum electromagnetic noise in response to an instruction from a circuit which controls power supply to a peripheral circuit in response to a starting instruction of said CPU.

5. A personal data assistant terminal with radio as claimed in claim 2, wherein the power supply mode of the CPU can be changed arbitrarily based on the status of the peripheral circuit.

6. A personal data assistant terminal with radio which has data transmission and reception functions by a radio wave and a plurality of different power supply modes, comprising:

a CPU for effecting power supply control of said personal data assistant terminal with radio;

said CPU having a terminal for receiving, as an input signal thereto, a power supply mode change-over signal representative of a power supply mode which is to be entered subsequently by said CPU, and another terminal for receiving, as an input signal thereto, a power supply mode defining signal for defining a power supply mode represented by the power supply change-over signal, wherein said CPU is started in a mode in which said CPU generates minimum electromagnetic noise in response to an instruction from a circuit which controls power supply to a peripheral circuit in response to a starting instruction of said CPU.

* * * * *